United States Patent [19]

Masetti et al.

[11] Patent Number: 5,604,749
[45] Date of Patent: Feb. 18, 1997

[54] HIGH CAPACITY DATA COMMUNICATION NETWORK AND NETWORK NODE SUITABLE FOR THE SAME

[75] Inventors: Francesco Masetti, Bologna, Italy; Jean-Michel Gabriagues, Bois Colombes, France

[73] Assignee: Alcatel N.V., Amsterdam, Netherlands

[21] Appl. No.: 542,873

[22] Filed: Oct. 13, 1995

Related U.S. Application Data

[63] Continuation of Ser. No. 278,278, Jul. 21, 1994, abandoned.

[30] Foreign Application Priority Data

Jul. 23, 1993 [IT] Italy .................................. MI93A1636

[51] Int. Cl.[6] ............................. H04J 1/02; H04L 12/433
[52] U.S. Cl. .......................................... 370/440; 370/489
[58] Field of Search ..................................... 359/123, 124, 359/125, 135; 370/16.1, 69.1, 71, 124, 85.1, 85.6, 85.7, 85.9, 85.12, 85.15, 94.3

[56] References Cited

U.S. PATENT DOCUMENTS

| | | | |
|---|---|---|---|
| 4,352,180 | 9/1982 | Schulze | 370/85.12 |
| 4,740,958 | 4/1988 | Duxbury et al. | 370/85.12 |
| 4,879,550 | 11/1989 | Hino et al. | 370/85.12 |
| 5,101,290 | 3/1992 | Eng et al. | 370/73 |
| 5,157,657 | 10/1992 | Potter et al. | 370/85.6 |
| 5,163,047 | 11/1992 | Perdikaris et al. | 370/85.7 |
| 5,210,750 | 5/1993 | Nassehi et al. | 370/85.6 |
| 5,289,302 | 2/1994 | Eda | 370/73 |
| 5,504,748 | 4/1996 | Potter et al. | 370/85.6 |

OTHER PUBLICATIONS

"A Parallel Architecture for a DQDB Man", by S. Casale, et al, Proceedings ICCC '92, Genova, Italy, 1992, pp. 415–419.

"Performance Enhancement in DQDB Networks", by P. Davids et al, Proceedings EFOC/LAN 1992, Paris, France, 1992, pp. 223–228.

"Asynchronous Transfer Mode: Solution for Broadband ISDN", by Prycker, Ellis Norwood, Nov. 1990, pp. 246–255.

*Primary Examiner*—Benedict V. Safourek
*Attorney, Agent, or Firm*—Sughrue, Mion, Zinn, Macpeak & Seas

[57] ABSTRACT

A high capacity data communication network based on a parallel architecture, linking the nodes of the network itself, having a plurality of logic communication media, wherein for each communication medium a different node of the network is primarily either advantaged or at a disadvantage. As a result, the fairness of the traffic handling is assured independently of the type of protocol used.

10 Claims, 3 Drawing Sheets

HIGH CAPACITY DATA COMMUNICATION NETWORK AND NETWORK NODE SUITABLE FOR THE SAME

This is a continuation of application Ser. No. 08/278,278 filed Jul. 21, 1994, now abandoned.

BACKGROUND OF THE INVENTION

The present invention relates to a high capacity data communication network and to a network node suitable for the same.

In both local (LAN) and metropolitan (MAN) area data communication networks, one of the factors to be taken into account in evaluating the communication protocol, is the possibility of a fair sharing of the communication medium capacity among the network nodes.

For a metropolitan area network a protocol, known as DQDB (Distributed Queueing Dual Bus), has been standardized by the IEEE 802.6 working group; for a detailed description of such protocol one may refer, e.g., to the book of Martin De Prycker titled "Asynchronous Transfer Mode: solution for Broadband ISDN", London, Ellis Horwood, November 1990, para. 6.5 "DQDB", pages 246 to 255.

Such a protocol is based upon a dual bus architecture, in which there are two network nodes that act also as head-end stations generating and erasing slots over and from the network, and in which all the network nodes transmit by capturing the free slots. One of the well known problems of such protocol is the "unfairness", i.e. the fact that some nodes of the network are favoured with respect to the others, more precisely: the nearer a node has a position on the bus close to the head-end station, the greater the probability of capturing a free slot will be; such advantage is reduced by the fact that the DQDB protocol has a slot-reserving mechanism.

Several solutions to this problem are known from the literature; for a short review see, e.g., P. Davids et al., "Performance enhancement in DQDB networks", Proceedings EFOC/LAN '92, pages 223 to 228, Paris, 24–26/06/92; such solutions do not solve totally the problem; moreover they are not always easily and economically implementable.

The data communication networks, in particular the metropolitan area networks, are nowadays requiring a higher and higher capacity in terms of traffic transportation.

Several solutions have been proposed using optical fibers and WDM (Wavelength Division Multiplex) technique, among which the parallel architecture based on DQDB protocol set forth by S. Casale et al. in "A PARALLEL ARCHITECTURE FOR A DQDB MAN", Proceedings ICCC '92 pages 415 to 419, Genoa, 28/10/1992, is of particular interest.

Also this parallel architecture has the problem of "unfairness" since it is composed of a plurality of dual buses all connected to the various nodes and using the DQDB protocol.

SUMMARY OF THE INVENTION

It is an object of the present invention to overcome the drawbacks of the known art and, in particular, to provide a network in which the capacity of the communication medium can be fairly shared among the network nodes, without reducing the throughput of the network itself.

This object is achieved through a data transmission network comprising a plurality of nodes, and a plurality of communication media; wherein each of said plurality of nodes communicates data through said plurality of communication media according to a distributed queue dual bus protocol; wherein each of said plurality of communication media interconnects all of said plurality of nodes to bidirectionally carry transmitted data independently of a remainder of said plurality of communication media; wherein each respective communication medium of said plurality of communication media has a different one of said plurality of nodes functioning as a respective head-end station of said respective communication medium; and wherein said respective head-end station has a highest priority to transmit data through said respective communication medium.

The object of the present invention is also achieved through a metropolitan area network comprising a set of nodes, and a first plurality of buses interconnecting all of said set of nodes; wherein said set of nodes includes subsets of nodes; wherein each of said first plurality of buses is a looped bus; wherein different ones of said set of nodes comprise means for generating and erasing time slots according to a set of different schemes; wherein each of said set of different schemes corresponds to one of said subsets of nodes; wherein each of said first plurality of buses interconnects all of said set of nodes independently of a remainder of said first plurality of buses; wherein each respective bus of said first plurality of buses has a different one of said set of nodes functioning as a respective head-end station of said respective bus; and wherein said respective head-end station has a highest priority to transmit data over said respective bus.

The object of the present invention is also achieved through a data communication network node comprising means for transmitting and receiving data through a plurality of logic communication media according to an identical time slot-based protocol, and means for generating time slots on at least one of said plurality of logic communication media; wherein said means for generating time slots does not generate time slots on all of said plurality of logic communication media.

By using a parallel architecture to connect the nodes of a network having a plurality of logic communication media, in which for every communication medium a different network node is primarily either advantaged or at a disadvantage, the fairness is assured aside from the type of protocol used.

In this manner, moreover, the capacity of the network not only is undiminished, but even increased.

Advantageously the logic communication media can be implemented through a single optical fiber by using the WDM technique.

The invention will become more apparent from the following description taken in conjunction with the attached drawings,

DESCRIPTION OF THE PREFERRED EMBODIMENTS

A data communication network always comprises a plurality of nodes and a communication medium designed to interconnect such nodes according to a communication protocol. It often happens that in data communication networks, at least one node has a preferential or penalizing condition as to the treatment of the traffic generated by it in relation to the connection with such communication medium; this can be due to the protocol, to the network topology, or both; in the case of a DQDB network the node acting as a head station is in a primary preferential condition and the node acting as an end station is in a primarily penalizing condition; the same applies to any node of the network; in fact, this will be in a preferential condition with respect to nodes that are located downstream of its position on the bus and will be in a penalizing condition with respect to nodes that are located upstream of its position on the bus.

The network in accordance with the present invention comprises at least one further communication medium designed to interconnect the nodes of the network according to the same communication protocol in such a way that a node of the network different from the preceding one is in the same preferential or penalizing condition as to the treatment of the traffic generated by it in relation to the connection with such further communication medium.

Figure 1:
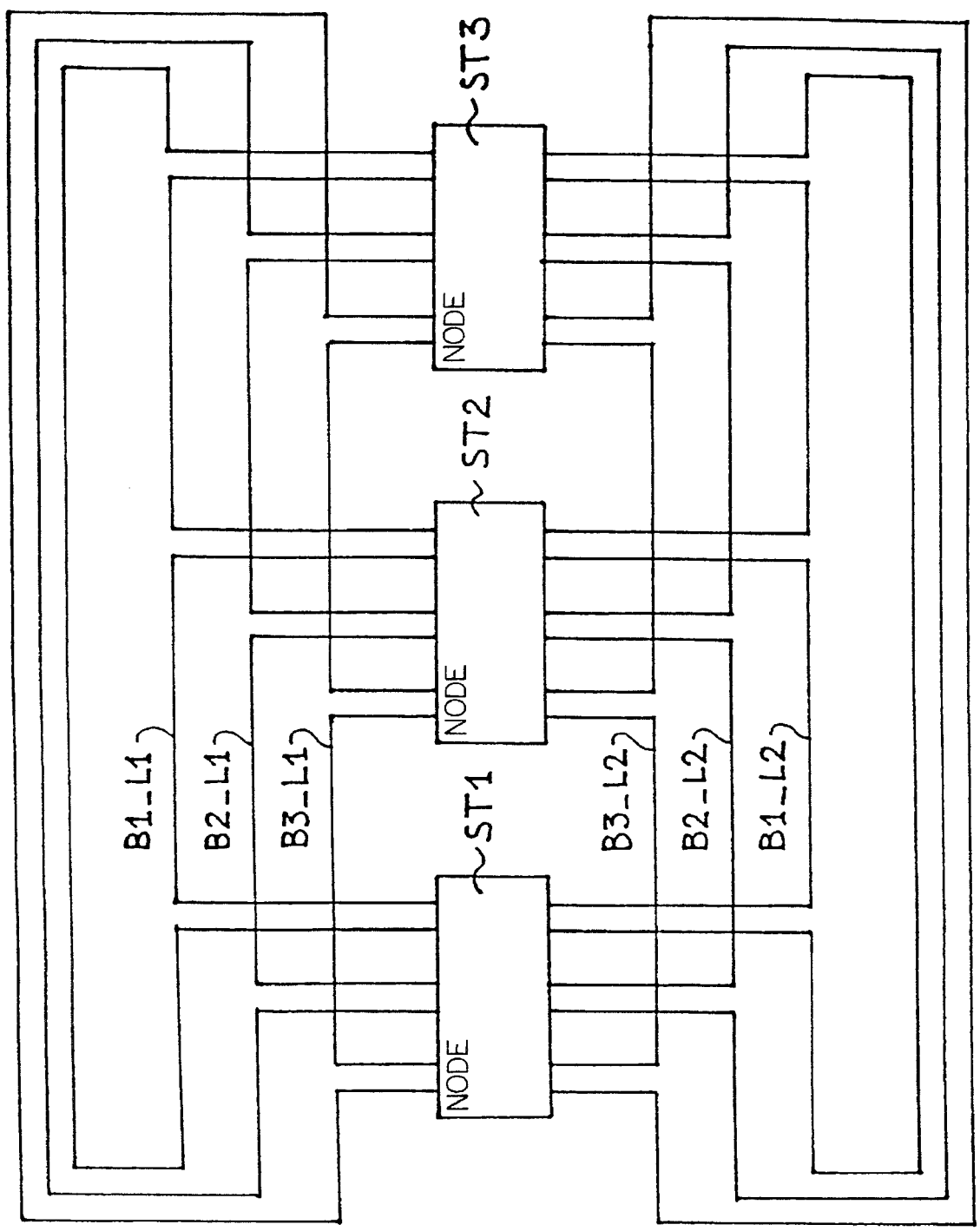
FIG. 1 shows an embodiment of a network, in accordance with the present invention, formed by three nodes.

The explanation as to how the teachings of the present invention can be applied to a DQDB network is given here with reference to FIG. 1.

The network illustrated in FIG. 1 comprises three nodes ST1, ST2, ST3 connected to each other through three dual buses B1, B2, B3; each dual bus comprises two single buses respectively designated by suffixes "-L1" and "-L2": therefore, e.g., the dual bus B1 comprises the single buses B1-L1 and B1-L2 and constitute a communication medium.

Assuming now to have at disposal a DQDB network formed by the three nodes ST1, ST2, ST3, and the dual looped bus B1; assuming in addition that node ST1 acts as head-end station for the dual looped bus B1. According to the teachings of the invention a second communication medium, which is a second dual looped bus B2, has to be arranged; and a node different from ST1 has to act as a head-end station: for instance node ST2.

In order to reach the maximum fairness, it will be enough to see that the number of communication media comprised in the network is equal to the number of nodes of the network itself: still referring to the foregoing example, it will be necessary to arrange three dual buses B1, B2, B3 in which the three nodes ST1, ST2, ST3 act respectively as head-end stations.

It is clear that in doing so the fairness of the network is no longer depending on the intrinsic fairness of the protocol; on the contrary, it can be even advantageous to use a strongly unfair, easy to implement protocol and have it to the network parallel structure to re-establish the fairness.

It is particularly advantageous if the communication media are realized through a sole physical or link (a coaxial cable, an optical fiber, . . . ) using the known frequency division multiplexing technique.

Figure 2:
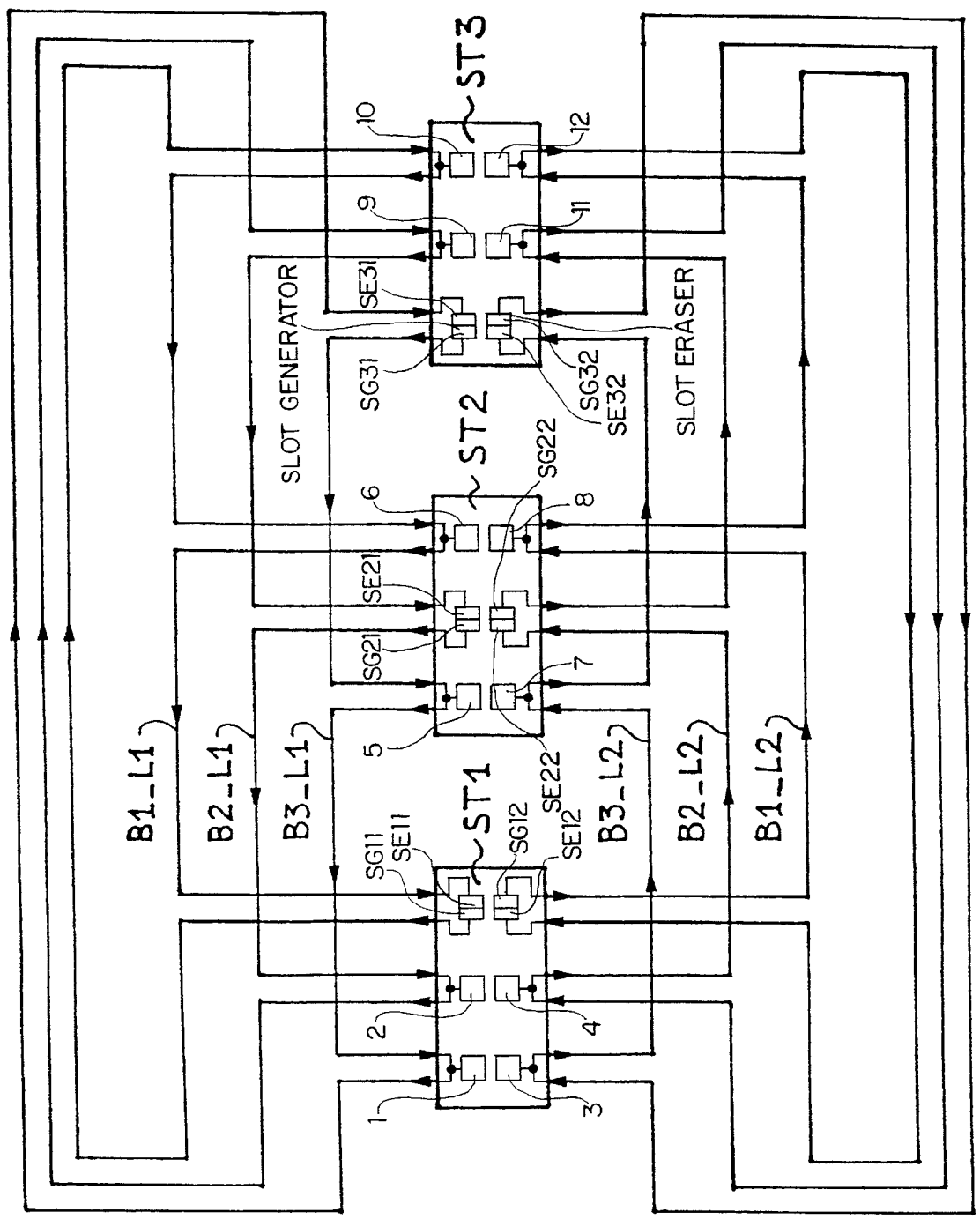
FIG. 2 shows an embodiment of the metropolitan network according to the invention, this embodiment comprising three communication media, each medium comprising two looped buses.

FIG. 2 shows a metropolitan network based upon the above-mentioned teachings in accord with the present invention.

Such metropolitan network comprises a set of nodes (e.g., ST1, ST2, ST3) and three communication media, each comprising two looped buses. The buses of (B1-L1, B2-L1, B3-L1) first plurality are designed to interconnect the nodes according to a corresponding plurality of slot capturing schemes, and different nodes operate from slot generation/erasure stations for different schemes. Each bus is respectively supported by an electrical conductor.

A second embodiment realization of such a metropolitan area network could be constituted by a parallel but simplified variant in the protocol of a DQDB network.

The DQDB protocol is based upon the fact that information slots travel over one of the single buses, and that the reservations of information slots travel over the other bus in an opposite direction to the preceding one; such mechanism is then doubled thanks to the presence of two buses (see Pages 246 to 255 of the afore-mentioned Martin De Prycker book for further details).

Since the reservations serve to improve the network's fairness, they could be eliminated thanks to the parallel structure illustrated above and therefore also the second bus could be avoided.

Naturally the ideal condition is when the number of buses of the first plurality is equal to the number of nodes of the set.

More advantageously from the network reliability viewpoint (possibility of open-bus reconfiguration in case of failures), the metropolitan area network further comprises a second plurality of looped buses (e.g. B1-L2, B2-L2, B3-L2) corresponding to such first plurality; the buses of such pluralities are, two-by-two, designed to interconnect the network nodes according to a corresponding plurality of multiple-access distributed queues schemes (DQDB), and different nodes act as head-end stations for different schemes.

As shown on FIG. 2, means for transmitting data on bus B1-L1, B1-L2, . . . , B3-L1, B3-L2, comprise, in station 1:

a slot generator SG11 having an output connected to a first end of the bus B1-L1;

a slot eraser SE11 having an input connected to the other end of the bus B1-L1;

a transmitter-receiver 1 having an input-output connected to the bus B3-L1;

a transmitter-receiver 2 having an input-output connected to the bus B2-L1;

a slot generator SG12 having an output connected to a first end of the bus B1-L2;

a slot eraser SE12 having an input connected to the other end of the bus B1-L2;

a transmitter-receiver 3 having an input-output connected to the bus B3-L2;

and a transmitter-receiver 4 having an input-output connected to the bus B2-L2.

In station ST2, means for transmitting data comprises:

a slot generator SG21 having an output connected to a first end of the bus B2-L1;

a slot eraser SE21 having an input connected to the other end of the bus B2-L1;

a transmitter-receiver 5 having an input-output connected to the bus B3-L1;

a transmitter-receiver 6 having an input-output connected to the bus B1-L1;

a slot generator SG22 having an output connected to a first end of the bus B2-L2;

a slot eraser SE22 having an input connected to the other end of the bus B2-L2;

a transmitter-receiver 7 having an input-output connected to the bus B3-L2;

and a transmitter-receiver 8 having an input-output connected to the bus B1-L2.

In station ST3, means for transmitting data comprises:

a slot generator SG31 having an output connected to a first end of the bus B3-L1;

a slot eraser SE31 having an input connected to the other end of the bus B3-L1;

a transmitter-receiver 9 having an input-output connected to the bus B2-L1;

a transmitter-receiver 10 having an input-output connected to the bus B1-L1;

a slot generator SG32 having an output connected to a first end of the bus B3-L2;

a slot eraser SE32 having an input connected to the other end of the bus B3-L2;

a transmitter-receiver 11 having an input-output connected to the bus B2-L2;

and a transmitter-receiver 12 having an input-output connected to the bus B1-L2.

Each bus constitutes a wired OR gate. For instance, B1-L1 constitutes a wired OR gate for the electrical signals respectively sent by slot generator SG11 and by transmitters-receivers 1 and 5.

A realization of such a metropolitan area network could consist in a parallel version of a DQDB network. Also in this instance, therefore, the slot reservation mechanism could be avoided. Such a realization would have the great advantage of increasing to a large extent the network capacity and fairness and of maintaining the compatibility with IEEE 802.6 standard.

Such a plurality of buses can be advantageously realized through a sole physical communication medium using the frequency division multiplexing technique.

In particular, due to high capacity needs, such physical communication medium can be an optical fiber and the used multiplexing technique is the wavelength division one.

Figure 3:
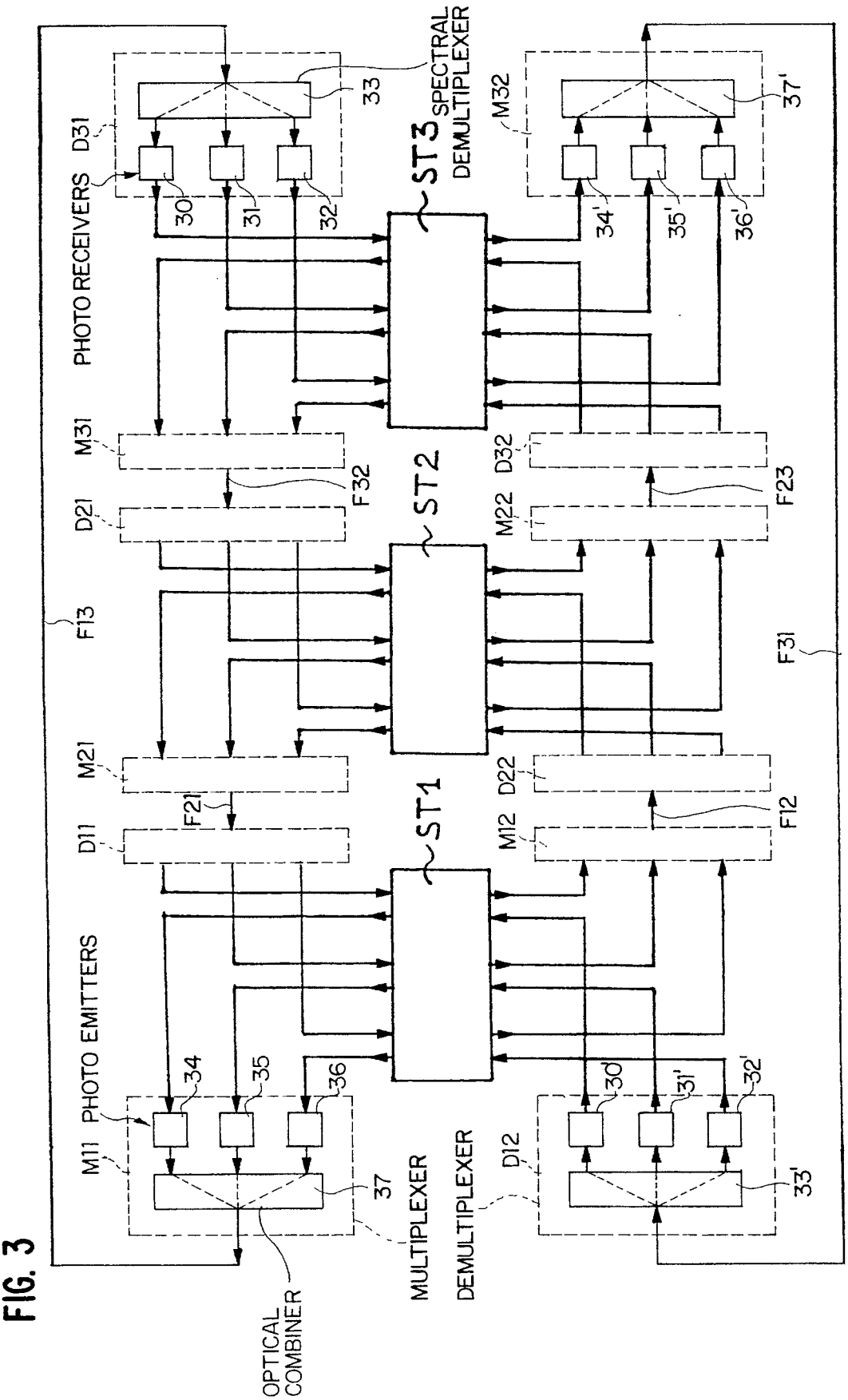
FIG. 3 shows the same embodiment, with the details of the physical means supporting these three communication media.

FIG. 3 shows the details of the physical means supporting the six buses: B1-L1, . . . , B3-L2. A first set of three buses B1-L1, B2-L1, B3-L1 is supported by a first optical loop constituted by fibers F13, F21, and F32. A second set of three buses B1-L2, B2-L2, B3-L2 is supported by a second optical loop constituted by fibers F31, F12, F23.

Three electrical outputs of station ST1 are connected to three inputs of a multiplexer M11. Three other electrical outputs of station ST1 are connected to three inputs of a multiplexer M12.

Three electrical outputs of station ST2 are connected to three inputs of a multiplexer M21. Three other electrical outputs of station ST2 are connected to three inputs of a multiplexer M22.

Three electrical outputs of station ST3 are connected to three inputs of a multiplexer M31. Three other electrical outputs of station ST3 are connected to three inputs of a multiplexer M32.

Three electrical inputs of station ST1 are connected to three outputs of a demultiplexer D11. Three other electrical inputs of station ST1 are connected to three outputs of a demultiplexer D12.

Three electrical inputs of station ST2 are connected to three outputs of a demultiplexer D21. Three other electrical inputs of station ST2 are connected to three outputs of a demultiplexer D22.

Three electrical inputs of station ST3 are connected to three outputs of a demultiplexer D31. Three other electrical inputs of station ST3 are connected to three outputs of a demultiplexer D32.

Multiplexer M11 has an optical output connected to a first end of fiber F13.

Multiplexer M21 has an optical output connected to a first end of fiber F21.

Multiplexer M31 has an optical output connected to a first end of fiber F32.

The second end of fiber F13 is connected to an optical input of demultiplexer D31.

The second end of fiber F32 is connected to an optical input of demultiplexer D21.

The second end of fiber F21 is connected to an optical input of demultiplexer D11.

Demultiplexers D11, D21, D31 have identical structures. For instance, D31 comprises:

a spectral demultiplexer 33 separating an optical signal received on its optical input into three optical signals having, respectively, three distinct wavelengths: $\lambda 1$, $\lambda 2$, $\lambda 3$; and three photoreceivers 30, 31, and 32 converting, respectively, these optical signals into three electrical signals and supplying them to the three outputs of the demultiplexer D31.

Multiplexers M11, M21, M31 have identical structures. For instance, M11 comprises:

three photo-emitters 34, 35, and 36 converting, respectively, three electrical signals received on the three inputs of multiplexer M11 into three optical signals, each having a distinct wavelength: $\lambda 1$, $\lambda 2$, and $\lambda 3$ respectively; and an optical combiner 37 superimposing these three optical signals and supplying the resulting signal to the optical output of multiplexer M11.

The second set of three buses is supported by similar means:

multiplexers M12, M22, and M32; and demultiplexers D12, D22, and D32.

A preliminary statement is now made as to the word subset of a predetermined set which will be used hereinafter to designate a set including a number of components comprised between 1 and N-1, where N is the number of components of such predetermined set.

Once a plurality of schemes has been prepared in advance, several variants to their use by the set of network nodes may arise, for instance: nodes belonging to a subset of the network transmit data by using only schemes belonging to a subset of the plurality, or nodes belonging to a subset of the network receive data by using only schemes belonging to a subset of the plurality.

Naturally, the network according to the present invention needs special nodes to be able to operate, at least capable of interacting with a plurality of communication media and of schemes.

In particular the network node in accord with the present invention is capable of transmitting and receiving data through a plurality of logic communication media according to the same slot-based protocol, and is such that, for at least one of the logic communication media, the node acts as a slot generator.

In addition, should the logic communication medium form a loop or a closed bus, it will act also as a slot eraser.

We claim:

1. A data communication network comprising:

a plurality of nodes, and a plurality of communication media;

wherein each of said plurality of nodes communicates data through said plurality of communication media according to a distributed queue dual bus protocol;

wherein each of said plurality of communication media interconnects all of said plurality of nodes to bidirectionally carry transmitted data independently of a remainder of said plurality of communication media;

wherein each respective communication medium of said plurality of communication media has a different one of said plurality of nodes functioning as a respective head-end station of said respective communication medium; and wherein said respective head-end station has a highest priority to transmit data through said respective communication medium.

2. The network according to claim 1, wherein the number of said plurality of communication media is equal to the number of said plurality of nodes.

3. The network according to claim 1, wherein:

said plurality of communication media are carriers having distinct wavelengths and are supported by only a single physical communication link; and each of said plurality of communication media comprises means for frequency multiplexing and demultiplexing data on said physical link.

4. A metropolitan area network comprising:

a set of nodes, and a first plurality of buses interconnecting all of said set of nodes;

wherein subsets of said set of nodes are defined within said set of nodes;

wherein each of said first plurality of buses is a looped bus;

wherein different ones of said set of nodes comprise means for generating and erasing time slots according to a respective scheme;

wherein each said respective scheme corresponds to one of said subsets of said set of nodes;

wherein each of said first plurality of buses interconnects all of said set of nodes independently of a remainder of said first plurality of buses;

wherein each respective bus of said first plurality of buses has a different one of said set of nodes functioning as a respective head-end station of said respective bus; and wherein said respective head-end station has a highest priority to transmit data over said respective bus.

5. The metropolitan area network according to claim 4, wherein the number of buses in said first plurality of buses is equal to the number of nodes in said set of nodes.

6. The metropolitan area network according to claim 5, wherein each node of one of said subsets of nodes comprises means for receiving data by using only said respective scheme belonging to a subset of said first plurality of buses.

7. The metropolitan area network according to claim 5, wherein each node of one of said subsets of nodes comprises means for transmitting data by using only said respective scheme belonging to a subset of said first plurality of buses.

8. The metropolitan area network according to claim 4, further comprising:

a second plurality of buses corresponding to said first plurality of buses;

wherein each of said first and said second plurality of buses interconnects all of said set of nodes; and wherein different ones of said set of nodes comprise means for transmitting and receiving data according to a respective multiple-access, distributed queue scheme.

9. The metropolitan area network according to claim 4, wherein:

said first plurality of buses are carriers having distinct wavelengths, and are supported by only a single physical communication link; and each of said first plurality of buses comprises means for frequency multiplexing and demultiplexing data on said physical communication link.

10. The metropolitan area network according to claim 9, wherein said physical communication link is an optical fiber.

* * * * *